UNITED STATES PATENT OFFICE.

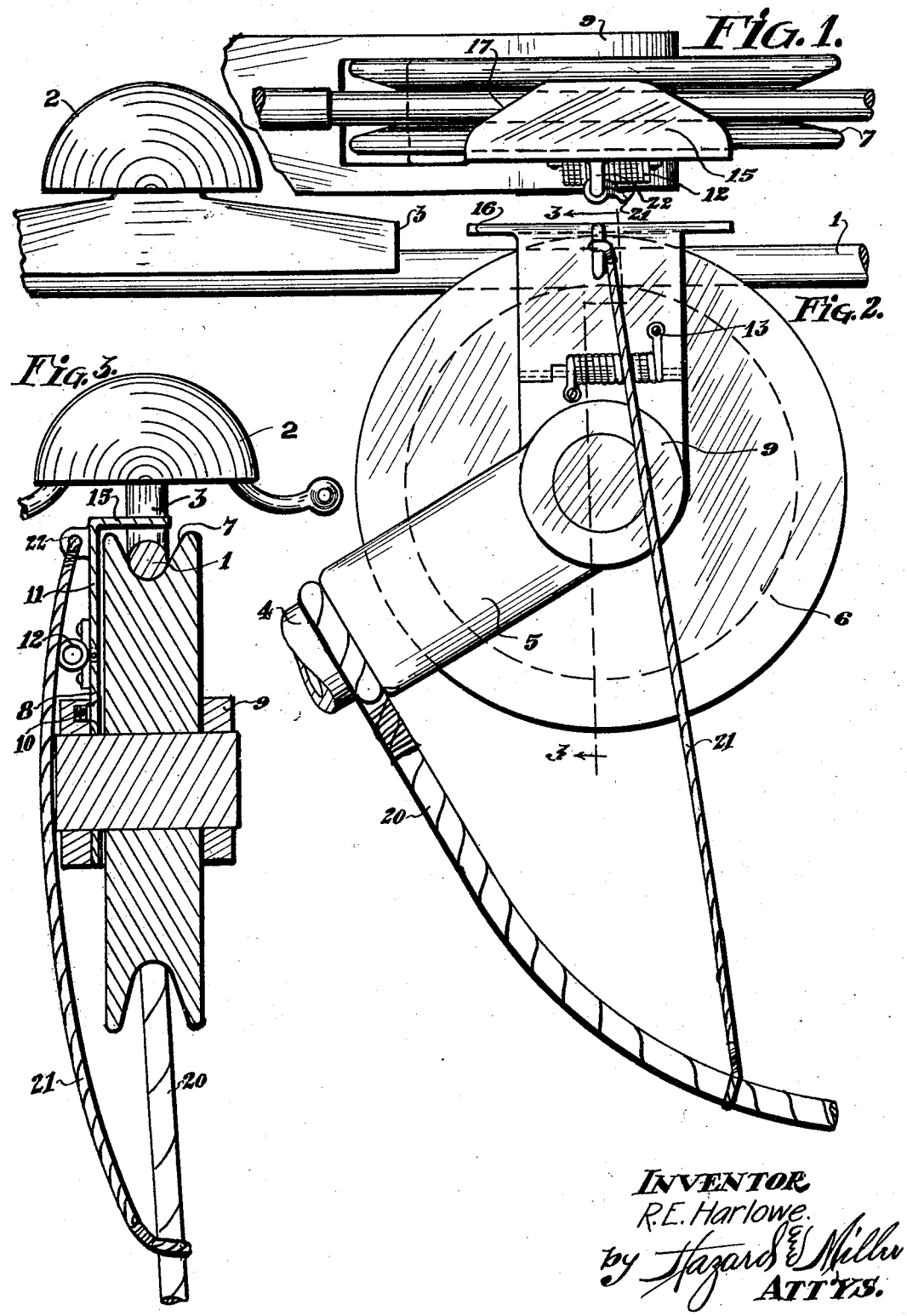

REPHAEL E. HARLOWE, OF LOS ANGELES, CALIFORNIA.

TROLLEY GUARD.

1,414,274.   Specification of Letters Patent.   Patented Apr. 25, 1922.

Application filed November 11, 1920. Serial No. 423,308.

*To all whom it may concern:*

Be it known that I, REPHAEL E. HARLOWE, a citizen of the United States, residing at Los Angeles, in the county of Los Angeles and State of California, have invented new and useful Improvements in Trolley Guards, of which the following is a specification.

It is the object of this invention to provide a trolley guard so arranged as to retain the trolley wheel in engagement with the trolley wire, but readily movable with relation to the trolley wheel so as to pass the suspension insulators for the trolley wire.

The invention will be readily understood from the following description of the accompanying drawings, in which;

Figure 1 is a plan view of a trolley with the wheel thereof engaging a trolley wire and provided with the improved guard.

Fig. 2 is a side elevation of the same.

Fig. 3 is a transverse section on the line 3—3 of Fig. 2.

I have shown the trolley wire at 1 supported by the usual suspension insulators 2 which are provided with the depending portions 3 engaging the trolley wire.

The trolley pole, harp and wheel may be of usual construction as shown at 4, 5 and 6, respectively, and the trolley wheel is provided with the usual grooved periphery 7 adapted to engage beneath the trolley wire 1.

The improved guard comprises a bracket 8 fixed to one of the bearings 9 for the trolley wheel as by the screw 10. The guard includes a plate 11 hinged to bracket 8 and extending upwardly therefrom at one side of the wheel 6. A coil spring 12 overlies the hinged connection between plate 11 and bracket 8 with the ends of said spring fixed to the plate and bracket, respectively, as shown at 13. By this arrangement it will be seen that the plate 11 is normally held in position extending upwardly along side of the wheel 6, but is arranged to yield outwardly so that the plate may swing away from wheel 6. It will be understood that as soon as the pressure against the plate is removed the tension of spring 12 will return the plate to its normal position.

The upper end of plate 11 extends beyond the periphery of wheel 6 and is angularly disposed as shown at 15 so as to overlie the trolley wire 1 in slightly spaced relation above the same. The ends of this guard portion of plate 11, preferably, extend beyond plate 11 as shown at 16 at the side of the guard portion adjacent plate 11. The guard 15 tapers toward the opposite edge of the same, as clearly shown in Fig. 1, so as to provide inclined ends 17 for said guard.

By this arrangement it will be seen that the guard will positively prevent the disengagement of the trolley wheel from the trolley wire when in operative position, and that when the trolley wheel approaches one of the suspension insulators the inclined end of the guard will abut against the portion 3 of the suspension insulator so as to swing the guard outwardly upon the hinge provided between plate 11 and bracket 8. The guard will thus pass the suspension insulator, and as soon as it is beyond the same will be returned to its operative position by the tension of spring 12.

The trolley pole may be provided with the usual trolley rope 20, and a flexible connection 21, preferably, extends from the trolley rope to an eye 22 provided upon plate 11 above its hinged connection with bracket 8, so that when the trolley rope is pulled to lower the trolley wheel from the trolley wire the guard will also be swung outwardly to permit of said disengagement of the trolley wheel from the trolley wire.

Various changes may be made without departing from the spirit of the invention as claimed.

What is claimed is:

1. The combination, with a trolley harp and wheel, of a plate fixed to one of the arms of the harp adjacent to the bearing for the wheel, and an inverted L-shaped guard plate having the lower end of its vertical leg hinged to said plate, the horizontal leg of which guard plate overlies the top of the trolley wheel and the wire receiving groove thereof.

2. The combination, with a trolley harp and wheel, of a plate fixed to one of the arms of the harp adjacent to the bearing for the wheel, an inverted L-shaped guard plate having the lower end of its vertical leg hinged to said plate, the horizontal leg of which guard plate overlies the top of the trolley wheel and the wire receiving groove thereof, and a spring for retaining said guard plate in operative position.

3. The combination, with a trolley harp and wheel, of a plate fixed to one of the arms of the harp adjacent to the bearing for the wheel, an inverted L-shaped guard plate having the lower end of its vertical leg hinged to said plate, the horizontal leg of which guard plate overlies the top of the trolley wheel and the wire receiving groove thereof, and both ends of the horizontal portion of said guard plate being inclined longitudinally.

4. The combination, with a trolley harp and wheel, of a plate fixed to one of the arms of the harp adjacent to the bearing for the wheel, an inverted L-shaped guard plate having the lower end of its vertical leg hinged to said plate, the horizontal leg of which guard plate overlies the top of the trolley wheel and the wire receiving groove thereof, a spring for retaining said guard plate in operative position, and both ends of the horizontal portion of said guard plate being inclined longitudinally.

In testimony whereof I have signed my name to this specification.

REPHAEL E. HARLOWE.